United States Patent [19]

Hanson et al.

[11] Patent Number: 5,030,977

[45] Date of Patent: Jul. 9, 1991

[54] PRINTED IMAGE MAGNETIC SIGNAL LEVEL CONTROL APPARATUS AND METHOD

[75] Inventors: William J. Hanson, Carlsbad; Richard I. Love, Oceanside, both of Calif.; Gerard L. Kappenman, Montrose, S. Dak.

[73] Assignee: AcuPrint, Inc., Carlsbad, Calif.

[21] Appl. No.: 480,751

[22] Filed: Feb. 15, 1990

[51] Int. Cl.[5] ...................... G01D 15/14; G03G 15/06

[52] U.S. Cl. .................................... 346/160; 355/260

[58] Field of Search ......................... 346/160; 355/260

[56] References Cited

U.S. PATENT DOCUMENTS

| | | | |
|---|---|---|---|
| 4,338,019 | 7/1982 | Terashima et al. | 355/260 |
| 4,672,017 | 6/1987 | Kamezaki | 430/122 |
| 4,786,942 | 11/1988 | Kusumoto et al. | 355/260 |
| 4,799,082 | 1/1989 | Suzuki | 355/260 |
| 4,862,828 | 9/1989 | Kumasaka et al. | 430/122 X |

*Primary Examiner*—George H. Miller, Jr.
*Attorney, Agent, or Firm*—Baker, Maxham, Jester & Meador

[57] ABSTRACT

Magnetic signal level control apparatus for a printer or copier. A continuous sampling of the magnetic characteristics of a reference mark results in constantly adjusting to maintain the specified quality of magnetically readable characters on printed documents. A controller generates a signal which is applied to the developer of the printer to control application of magnetic ink or toner to the photoconductor and consequently to the paper. The invention also includes the method for controlling magnetic signal level.

12 Claims, 3 Drawing Sheets

LASER SCANNER
15
11
25
13
14
16
12
24
31
32
21
17
23
22

14
13
27
31
26
32
27
N
+

61
MEMORY
62
RASTER IMAGE PROCESSOR
42
CONTROLLER
64
34
17
MAGNETIC READ HEAD
35
AMPLIFIER
39
40
PEAK HOLD DETECTOR
41
ANALOG TO DIGITAL CONVERTER
33
MAGNETIZER
80
43
CONTROL ALGORITHM
44
45
DEVELOPER BIAS VOLTAGE ADJUST
23
FUSER
TRANSFER STATION
21
47
46
ENGINE FEEDBACK CONTROL
51
52
HIGH VOLTAGE POWER SUPPLY
53
DEVELOPER
15
LASER SCANNER
17

PRINTED IMAGE MAGNETIC SIGNAL LEVEL CONTROL APPARATUS AND METHOD

FIELD OF THE INVENTION

This invention relates generally to printers and copiers and more particularly concerns apparatus and method for controlling the magnetic signal characteristics on a printed substrate.

BACKGROUND OF THE INVENTION

Magnetic ink character recognition (MICR) characters are used in a specialized, machine readable type font, used to encode documents such as checks, to facilitate the automated reading of data from those documents using high speed reader/sorters. Other applications employing MICR characters include sales promotion coupons, credit cards, passenger tickets, insurance premium receipts, billing, etc. MICR characters are printed using a magnetic ink or toner to enable reading of the characters by optical and/or magnetic read heads. The term "magnetic ink" means ink or toner capable of being magnetized and sensed. MICR characters are printed using a variety of printing technologies including letterpress, lithography and non-impact electronic printing technology. In order to ensure compatibility between printed MICR characters and devices designed to read these characters, specifications for the geometric shape of the characters and the magnetic wave form generated when the characters are read with a magnetic read head have been developed by the American National Standards Institute (ANSI) and the American Bankers Association (ABA).

To comply with the ANSI and ABA specifications it is necessary that the printed MICR font produce characters which are designed to fall within the geometric shape boundaries (nominal shape plus allowable dimensional tolerances) defined in the specifications. It is further necessary to ensure that the magnetic signal characteristics are maintained within specification by, controlling the magnetic characteristics of the toner used to create the MICR characters and by controlling the amount of toner laid down by the non-impact printing process. Finally, the MICR characters are required to exist within a clear band. The clear band is a horizontal band 0.625 inch (15.9 mm) wide that must be free of any magnetic ink, except MICR, and can be vertically located as determined by the application involved. This clear band, which includes the MICR printed characters, is printed at the bottom of printed checks as specified in the ANSI specifications. A check or multiple checks may be located vertically on the paper as determined by the application involved when printed.

A popular non-impact printing technology employed for the automatic printing of documents, including checks, is electrophotography. This is the printing process often used in photocopiers and laser printers. Electrophotography is an imaging process which has a well known tendency to drift, in terms of print quality, due to a variety of factors including materials aging, sensitivity to variations in ambient relative humidity, batch to batch differences in toners and photoconductors, sensitivity to toner sump fill level, among others. The drift in performance of non-impact printers is typically manifested in undesirable variations in optical density of the printed output. In non-impact printers which are used to print MICR documents, this drift can result in unacceptable variability in magnetic signal level of MICR characters.

In order to control output density variability of printed pages, some presently available copiers and laser printers employ internal control systems which monitor optical density and modulate electrophotographic process variables to control output density within acceptable limits. One variable monitored in some printers is the relative proportions of toner and carrier in the development system. Typically, these control systems are limited to incorporation in higher priced copiers and printers. Furthermore, these systems are intended to control optical image density. Many laser printers, especially low speed devices, do not even employ the optical density control systems found in products such as the Xerox 9790 printer. An attempt is typically made in these systems to run critical subsystems such as development at a "saturated" condition. These open loop approaches cannot compensate for many sources of optical density variability such as those induced by changes in relative humidity, machine aging and batch-to-batch variations in toner properties.

None of the systems described above attempt to, or are capable of, controlling magnetic characteristics of printed images. It is this area of magnetic signal characteristics of images which are important in processing documents such as checks and to which this invention is directed.

It is important to realize that control of optical density of printed images is not sufficient to ensure that the magnetic characteristics of the printed images are being adequately controlled. In the example of the Xerox 9790 high speed MICR laser printer (a 120 page per minute printer) the printing process employs a system to control the optical density of the images as printed. This system is not sufficient to ensure that magnetic signal characteristics of MICR documents are printed correctly. Customers of Xerox 9790 printers typically must utilize expensive test equipment and trained operators to examine sample documents for magnetic signal levels. If tested documents do not have correct signal levels then adjustments are made to the printer by the operator or by a service technician.

SUMMARY OF THE INVENTION

Broadly speaking, this invention comprises means to measure the magnetic signal level of documents printed by a non-impact printer or copier and has an associated control loop which modulates the amount of toner printed in the MICR character field to ensure that MICR signal levels fall within those specified boundaries described in the ANSI and ABA specifications.

In order to modulate the signal level of printed documents, to ensure that the signal strength of MICR characters fall within the limit specified by ANSI and ABA, the developed mass of toner produced by the electrophotographic process is varied. This is accomplished by adjusting electrical bias of the development electrode (typically a developer roll). The amount of toner printed in image areas of the document is directly related to the electrical field in the development zone of the printer. This field, in turn, is determined by the potential difference between the voltage on the image areas of the photoconductor and the bias on the developer roll. Varying developer roll bias, therefore, will vary the amount of toner laid down in image areas of the print.

Specifically, the invention includes a magnetic read head installed in the paper path of the laser printer positioned in such a manner that it can sense the magnetic signal strength of a magnetized reference mark printed on the documents produced by the laser printer. The reference mark is embedded in a convenient location on the documents, such as checks, printed by the laser printer such that it does not interfere with other critical image data on the check. The magnetic signal level produced by the reference mark correlates directly with signal strength of the MICR characters printed on the check because they are printed at the same time and under the same conditions.

In the process of printing, the printed reference mark is magnetized by a permanent magnet positioned in the paper path between the fuser and the read head and located such that it comes into close proximity with the printed reference mark. The magnetized reference mark is then read by the read head.

After the signal strength of the reference mark is sensed, the information is typically amplified, digitized and interpreted or compared by a controller, such as a microprocessor, in the printer with a preset signal value level. The difference signal is utilized to invoke a control/modulation algorithm in the controller which provides a control signal to the printer. This control signal regulates the bias voltage applied to the developer portion of the printer to thereby modulate the amount of toner applied to the photoconductor and subsequently to the substrate, which may be paper on which checks are printed.

BRIEF DESCRIPTION OF THE DRAWING

The objects, advantages and features of this invention will be more readily perceived from the following detailed description when read in conjunction with the accompanying drawing, in which.

DESCRIPTION OF THE PREFERRED EMBODIMENTS

For purposes of exposition, the invention will be explained in terms of a laser printer. It should be understood that the invention is much more broadly applicable to printers and copiers. It is applicable to imaging systems which produce readable images and employing a development system which is electrically biasable to effect the amount of development material that can be modulated and form an image on a substrate. Examples of such image forming systems are electrostatic printers, photocopiers, laser printers and ion deposition printers, among others.

Figure 1:
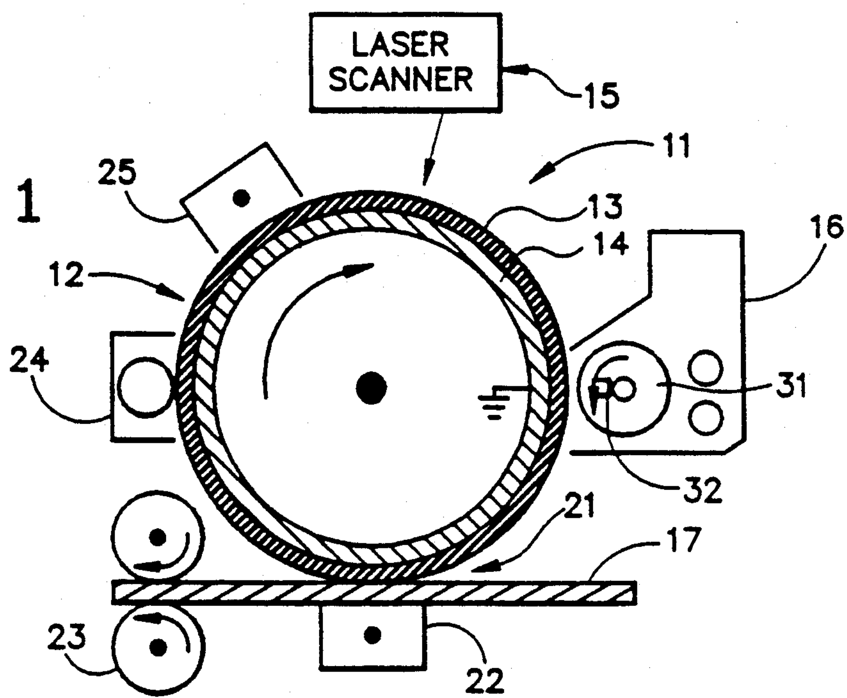
FIG. 1 is a schematic representation of an electrophotographic apparatus and process.
Figure 2:
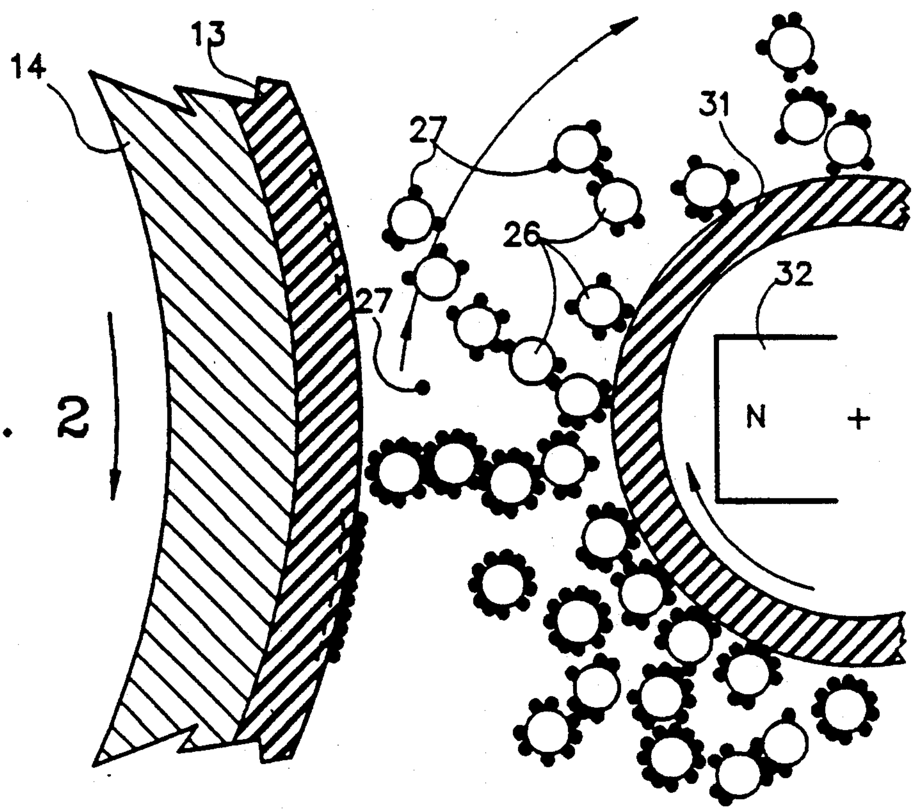
FIG. 2 shows in enlarged form a fragmentary portion of a dual-component development system of the electrophotographic printer.

With reference now to the drawing, and more particularly FIGS. 1 and 2 thereof, there is shown electrophotographic apparatus 11 having photoconductor drum 12 comprises a thin insulative photoconductor coating 13 on conducting substrate 14. A uniform electrostatic charge is placed on the photoconductor by charging device 25, such as a corotron or a scorotron. Exposure is provided by laser scanner 15 to produce a latent image which is developed by development system 16 which applies toner selectively to the exposed photoconductor surface 13. This developed image is transferred to paper 17 at transfer station 21, typically by means of corotron 22 which creates an appropriate electrostatic field to produce the toner transfer.

After the image, which is comprised of toner powder, is transferred to the paper, it is fixed or fused at fuser 23. The fuser normally applies heat or pressure or both to the toner and substrate combination. In a typical electrophotographic apparatus, any residual toner left on the photoconductor after transfer is removed by cleaner 24. The process is then repeated for subsequent prints by recharging the photoconductor by means of charging station 25.

A typical manner in which toner is transferred to the photoconductor is shown in FIG. 2. This depicts a dual-component development system which is commonly used in non-impact printers and copiers. A segment of photoconductor drum is shown with substrate 14 having coating 13 thereon. It will be noted that there are patterns of minus (−) signs shown just under the external surface of the coating. This represents selective charge areas which comprises the latent image on the drum. Assuming the toner comprises positively charged elements, they will be attracted to the surface of the drum in the areas where the photoconductor coating has a negative charge. This is the development which transforms a latent image into a visible or developed image. Toner develops the latent image under the influence of the electric field between the photoconductor and the electrically biased developer roll. The toner adheres to the image areas due to the electrostatic attraction between the toner and the latent image. There are other ways this electrostatic image making can be accomplished but the specifics are not important to the invention. They all employ the basic elements of FIGS. 1 and 2 and employ an electrostatic field between the developer roller and the photoconductor.

The development system shown in FIG. 2 is referred to as dual-component development because it employs a carrier element 26 in addition to toner elements 27. The carrier is a granular material, typically about 100 microns in diameter, which is approximately the diameter of a human hair. The carrier grains may consist of magnetically permeable material, such as iron or nickel, which is coated with a thin tribo-active layer. An electrostatic charge is exchanged between the toner and the carrier by virtue of tribo-electrification. The carrier physically carries the toner into the development zone, which is the closest point of approach of the drum surface. Carrier and toner are mixed inside the development housing by an active mixing system such as mixing paddles or a set of augers. The tribo-active coating on the carrier is selected so that mixing of toner and carrier causes electrostatic charges to tribo-electrically transfer between toner and carrier.

There are a number of different development systems available to be used. The dual component development system described above is one example and is widely used in image creation. Other examples include conductive single component development systems, insulative single component, liquid development and several hybrid systems. This invention is well suited to all of these development systems.

The developer is magnetically transported to the development zone. Typically rotating roller 31, with a stationary magnetic or series of magnets 32 positioned inside the roller, is utilized to transport the developer into the development zone. The magnet causes the developer material to align itself into magnetic bristles, hence the term "magnetic brush" development. Once in the development zone, the toner is stripped from the carrier due to a combination of mechanical agitation and electrostatic stripping forces and is electrostatically attracted to those areas corresponding to the image portion of the latent image on the photoconductor.

The amount of toner which is attracted to any oppositely charged portion of the photoconductor depends upon the strength of the development field between the developer roll and the photoconductor. In accordance with the invention, this development field can be controlled by the amount of bias applied to conductive developer roller 31. A bias adjustment signal is developed by the control diagram shown in the FIG. 3 block diagram. As is evident from the drawing, reference mark 37 is embedded in a convenient location on check 36 such that it does not interfere with the critical image data on the check. A representative mark is depicted in FIG. 4. Many other shapes of reference marks, including MICR characters, can work as well. To facilitate operation of this invention, the clear band has been expanded in width to include space for the reference line. This line is outside the ANSI clear band but within the enhanced width clear band. The magnetic signal level produced by the reference mark correlates directly with signal strength of MICR characters printed on that same document at the same time.

Magnetizer head 33 is positioned in the paper path following fuser 23 and magnetizes the reference mark which is printed adjacent to the MICR characters. Magnetic read head 34 is positioned in the paper path of the laser printer after the magnetizer such that it senses the magnetic signal strength of the reference mark as shown in FIG. 4.

Figure 3:
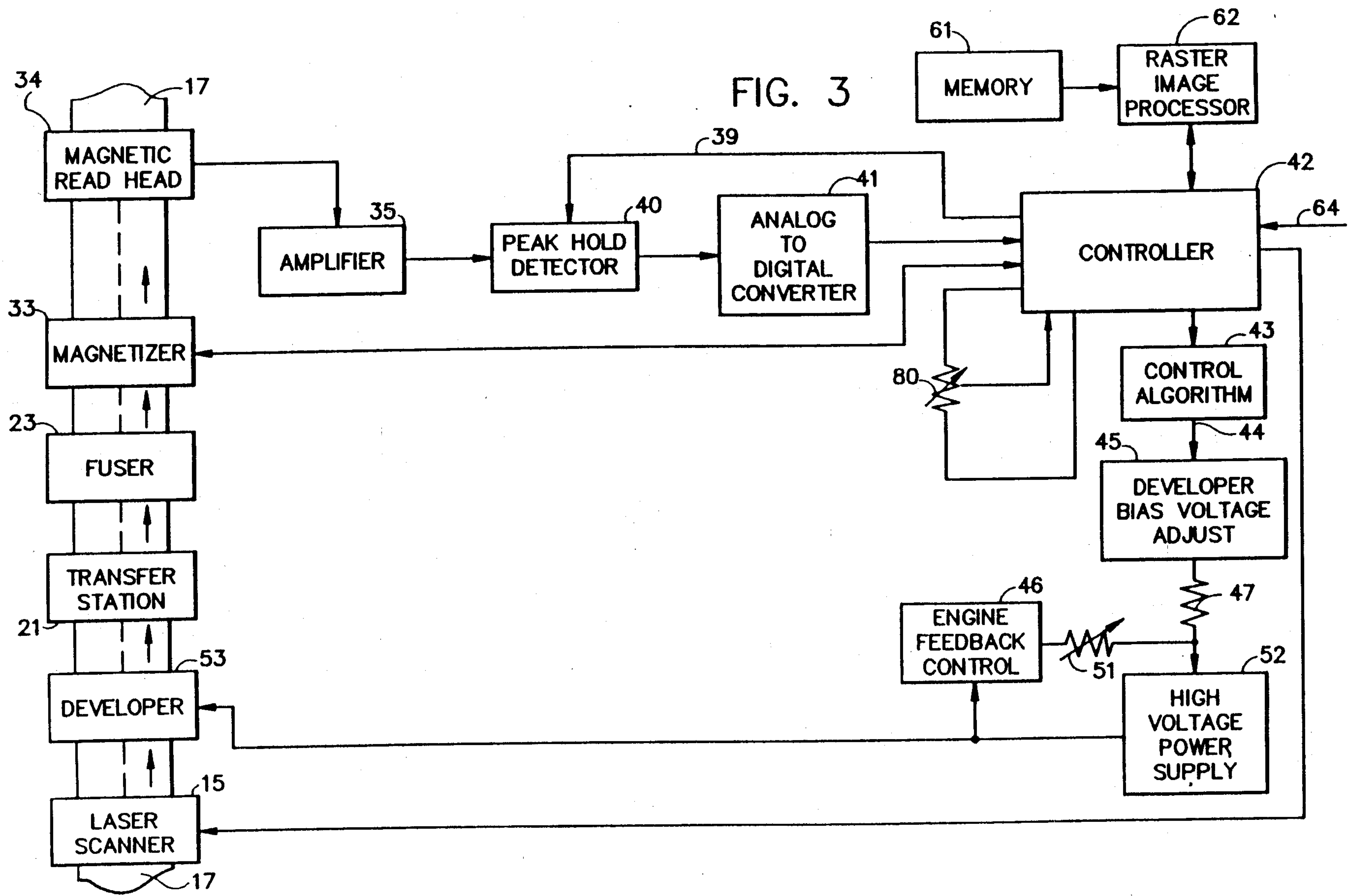
FIG. 3 is a block diagram of the control system of the invention.
Figure 4:
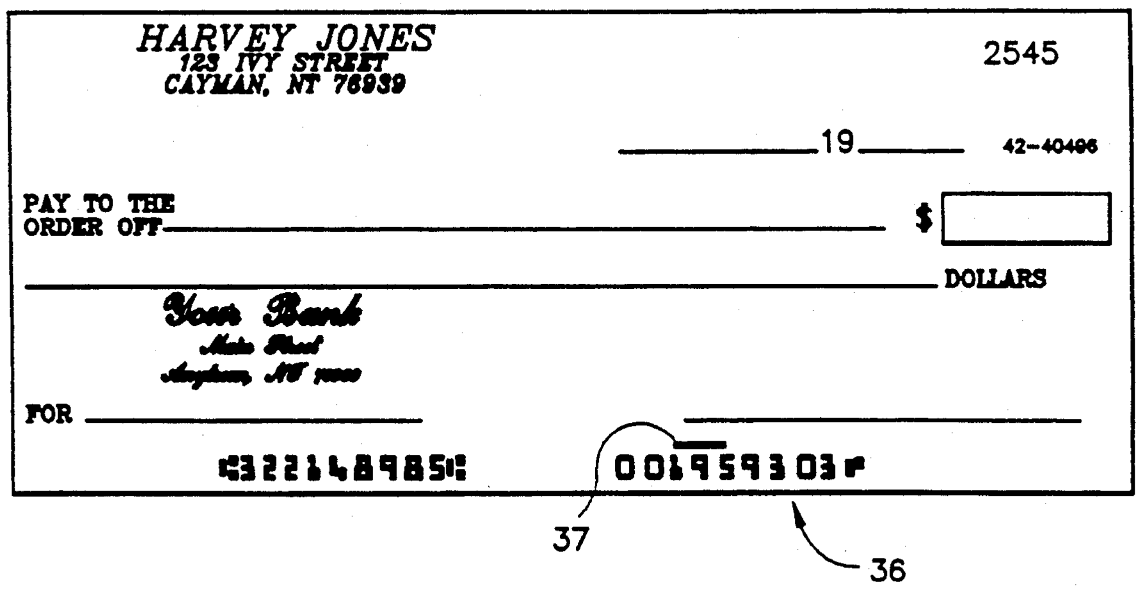
FIG. 4 is an example of a check with a reference mark showing the standard MICR characters.

With reference to FIG. 3, memory 61 has stored therein certain page formats which are selectively used to control raster image processor (RIP) 62 which, through the controller, controls the operation of laser scanner 15. For example, if data applied through input 64 instructs controller 42 to construct a logical page comprising checks, then the controller sends the page information to RIP 62 to include the MICR location and the specific characters of the MICR line and the reference mark. At this time the RIP starts sending the image data to the scanner, which is monitored by controller 42, which modifies the image data at the appropriate time to ensure that the clear band is maintained.

It is critical that the quality of the printed MICR line be controlled to ensure compliance with the ANSI specification for MICR. Therefore, the amount of toner in the MICR line is not subject to operator control. Other areas of the check are printed in variable fashion and can be controlled by the input computer or the operator, or both. When the MICR clear band reaches the developer, control of the bias is taken by controller 42 and the reference mark and the MICR line are imprinted. By this process the system knows it is printing a check with a MICR line and that there is a reference mark at a specific location.

With that information, the signal detected by the read head can be read at the point when the reference mark passes under the read head. The signal from head 34 is amplified in amplifier 35, a peak amplitude is stored in peak/hold detector 40 and then is converted from analog to digital form in A-D converter 41. The digital signal from the converter is then applied to controller 42, which would normally be a microprocessor having a variety of functions. One of the functions is indicated by block 43 which is a control algorithm. A timing control signal is applied from controller 42 to detector 40 over line 39. In the controller is a preset value which is compared with the digital signal value from converter 41. The difference between these values is the input to control algorithm 43 which develops a control signal on line 44. This control signal is applied to developer bias voltage adjust block 45. The bias voltage adjust signal output from block 45 is applied to resistor 47. Variable resistor 80 is a user adjustable potentiometer which controls nominal optical density. Resistor 51 is the factory set nominal developer roll bias which is overridden by the control system which is the subject of this invention. Resistor 47 is the means for developing the voltage necessary for overriding variable resistor 51. The bias on the developer roll affects the development field between the photoconductor and the developer roll. By varying the bias, the field is modified thereby varying the amount of toner in a given period of time which adheres to the desired areas on the exposed surface of the photoconductor. The loop including engine feedback control 46 serves to control developability, that is, the amount of toner developed, by modulating the developer bias and includes resistor 51.

Developer bias is modulated in small increments, under control of the software algorithm in the printer controller, to make appropriate adjustments in the output magnetic signal level to compensate for the natural drift of the electrophotographic process or for other causes for variations in the MICR line printing process.

An important aspect of this invention is that control of the magnetic signal level can be restricted to the clear band, which includes the MICR line on the check, without affecting optical density of other areas of the documents. This capability results from the ability of the development system to rapidly respond to variations in developer bias. The developer bias can be switched dynamically during the imaging of the check, resulting in different developer bias setting for the MICR printed portion of the print as opposed to other image areas of the document. This feature enables the printer operator to have full control of optical density of non-MICR portions of the printed documents, via variable resistor 80, to suit their aesthetic preferences, while ensuring that the MICR control loop holds the MICR signal level within the ANSI and ABA specified limits.

Control of the check printing, specifically of the MICR line, is monitored and controlled by controller 42. In this way timing is precise so that the MICR line and reference mark are printed and sensed, and modifications are made continually to ensure proper magnetic density of the MICR characters on a real time basis. The controller generated bias signal is applied to the developer roll only when it is time to develop the MICR line. Otherwise the general bias provided by resistor 51 governs the bias on the developer roll.

Thus the system of this invention senses the magnetic characteristics and controls the developer station bias to control the applied toner density specifically of the MICR line. The magnetic signal of a magnetized mark depends on the edge gradient from blank space to a MICR character. it is not the solid area optical density of the surface of the character that is of interest.

In view of the above description, it is likely that modifications and improvements will occur to those skilled in the art which are within the scope of the appended claims.

What is claimed is:

1. Magnetic signal level control apparatus for imaging apparatus employing an electrostatic development system that is electrically biasable to effect the amount of development material that can be modulated, the development material being selectively applied to an electrostatic latent image surface and forming a visible image on a substrate, an image density control apparatus comprising:

a magnetic read head positioned to sense the magnetic signal strength of an image on the substrate and produce a signal representative thereof;

means for comparing the value of the representative signal with a preset value and producing a difference signal;

means for producing control signal related to the difference signal; and means for applying said control signal to the development system to thereby control the amount of development material applied to selected image areas on the substrate and thereby control the magnetic image density on the substrate.

2. The apparatus recited in claim 1, and further comprising means for converting the representative signal to a digital signal.

3. The apparatus recited in claim 1, and further comprising means to amplify the signal from said read head.

4. The apparatus recited in claim 1, wherein said comparing means and control signal producing means are incorporated in a controller, said controller being coupled to said development system to control what image is applied to said substrate.

5. The apparatus recited in claim 4, wherein said controller incorporates a reference mark into the information being printed by the imaging apparatus, said reference mark being sensed by said read head.

6. Magnetic signal level control apparatus for imaging apparatus employing the electrophotographic process, said electrophotographic apparatus including page memory means, a raster image processor, a photoconductor, a development system having a developer roll and toner, the toner being selectively applied to the photoconductor, a substrate, a fuser to fix the image to the substrate, means for charging the photoconductor and a modulated light source for exposing the photoconductor to create the desired image, an image density control apparatus comprising:

a magnetic read head positioned to sense the magnetic signal strength of an image on the substrate and produce a signal representative thereof;

means for comparing the value of the representative signal with a preset value and producing a difference signal;

means for producing control signal related to the difference signal; and means for applying said control signal to the developer roll to thereby control the amount of toner applied to selected image areas on the photoconductor and thereby control the magnetic image density on the substrate.

7. The apparatus recited in claim 6, and further comprising means for converting the representative signal to a digital signal.

8. The apparatus recited in claim 6, and further comprising means to amplify the signal from said read head.

9. The apparatus recited in claim 6, wherein said comparing means and control signal producing means are incorporated in a controller, said controller being coupled to said raster image processor to control what image is applied to said photoconductor by being exposed by the modulated light source.

10. The apparatus recited in claim 9, wherein said controller incorporates a reference mark into the information being printed by the imaging apparatus and associated raster image processor, said reference mark being sensed by said read head.

11. A method for controlling magnetic signal level on substrates printed with image areas by an electrostatic development system that is electrically biasable to effect the amount of development material that can be modulated, the development material being selectively applied to an electrostatic latent image surface and forming a visible image on a substrate, said method comprising the steps of:

sensing the magnetic signal strength on the selected image areas of the printed substrate;

producing a signal representative of the value of the magnetic signal strength;

comparing said representative signal value with a preset value to produce a difference signal;

producing a control signal related to the difference signal; and applying said control signal to the development system to thereby control the amount of development material applied to selected image areas on the substrate and thereby control the image density on the substrate.

12. The method recited in claim 11, and comprising the further steps of:

causing the development system to print a reference mark on the substrate, which reference mark is read in said sensing step;

magnetizing the reference mark after it is printed on the substrate; and synchronizing the printing of said reference mark with the application of the control signal to the development system and the reading of the reference mark.

* * * * *